US010648517B2

(12) United States Patent
Mastie et al.

(10) Patent No.: US 10,648,517 B2
(45) Date of Patent: May 12, 2020

(54) BI-STABLE FRONT AXLE DISCONNECT WITH SYNCHRONIZER (71) Applicant: BorgWarner Inc., Auburn Hills, MI (US)

(72) Inventors: Joseph D. Mastie, Belleville, MI (US); Larry A. Pritchard, Macomb, MI (US)

(73) Assignee: BorgWarner Inc., Auburn Hills, MI (US)

(*) Notice: Subject to any disclaimer, the term of this patent is extended or adjusted under 35 U.S.C. 154(b) by 138 days.

(21) Appl. No.: 15/627,485

(22) Filed: Jun. 20, 2017

(65) Prior Publication Data
US 2017/0370426 A1 Dec. 28, 2017

Related U.S. Application Data (60) Provisional application No. 62/354,467, filed on Jun. 24, 2016.

(51) Int. Cl.
F16D 23/06 (2006.01)
B60K 23/08 (2006.01)
B60K 17/35 (2006.01)
B60K 17/02 (2006.01)
B60K 17/344 (2006.01)

(52) U.S. Cl.
CPC .............. F16D 23/06 (2013.01); B60K 17/02 (2013.01); B60K 17/3515 (2013.01); B60K 23/0808 (2013.01); B60K 17/344 (2013.01); B60K 2023/0816 (2013.01); B60K 2023/0858 (2013.01); B60K 2023/0866 (2013.01); B60Y 2400/421 (2013.01); F16D 2023/0631 (2013.01)

(58) Field of Classification Search
CPC .......... F16D 23/06; F16D 27/14; F16D 11/08; F16D 2023/0631; B60K 23/0808; B60K 17/3515; B60K 17/02; B60K 17/344; B60K 2023/0816; B60K 2023/0858; B60K 2023/0866; B60Y 2400/421
See application file for complete search history.

(56) References Cited

U.S. PATENT DOCUMENTS

| 4,545,469 A | * | 10/1985 | Yogome | F16H 3/14 192/109 A |
| 5,827,148 A | * | 10/1998 | Seto | B60W 10/10 477/15 |
| 9,518,623 B2 | | 12/2016 | Mastie et al. | |
| 2017/0144541 A1 | * | 5/2017 | Kincaid | B60K 17/348 |

* cited by examiner

Primary Examiner — Jacob S. Scott
Assistant Examiner — Lillian T Nguyen
(74) Attorney, Agent, or Firm — Young Basile Hanlon & MacFarlane, P.C.

(57) ABSTRACT

A product comprising: an axle shaft and an input shaft, wherein the axle shaft is coaxial with the input shaft; a clutch operatively connected to the axle shaft and the input shaft constructed and arranged to selectively couple and decouple the input shaft and the axle shaft; an actuator operatively connected to the clutch to drive the clutch; and a synchronizer operatively connected to the clutch to synchronize the coupling of the input shaft and the axle shaft.

20 Claims, 5 Drawing Sheets

BI-STABLE FRONT AXLE DISCONNECT WITH SYNCHRONIZER

CROSS-REFERENCE TO RELATED APPLICATIONS

This application claims the benefit of U.S. Provisional Application No. 62/354,467, filed Jun. 24, 2016.

TECHNICAL FIELD

The field to which the disclosure generally relates to includes vehicle powertrains.

BACKGROUND

A vehicle may include at least one driveline which may drive the vehicle.

SUMMARY OF ILLUSTRATIVE VARIATIONS

A number of variations may include a product comprising: an axle shaft and an input shaft, wherein the axle shaft is coaxial with the input shaft; a clutch operatively connected to the axle shaft and the input shaft constructed and arranged to selectively couple and decouple the input shaft and the axle shaft; an actuator operatively connected to the clutch to drive the clutch; and a synchronizer operatively connected to the clutch to synchronize the coupling of the input shaft and the axle shaft.

A number of variations may include an axle disconnect assembly for translating rotational torque between an input shaft and an axle shaft comprising: a clutch operatively connected to the input shaft and the axle shaft, wherein the clutch is constructed and arranged to selectively couple and decouple the input shaft and the axle shaft, wherein the clutch comprises a shift fork assembly operatively connected to a sleeve, wherein the shift fork assembly is constructed and arranged to move the sleeve axially in relation to the input shaft and the axle shaft, and a coupling member operatively connected to the input shaft; wherein when the sleeve is in a first position, the input shaft and the axle shaft are not coupled together and wherein when the sleeve is in a second position the input shaft and the axle shaft are coupled together; and a cone synchronizer, wherein a friction cone of the cone synchronizer is operably attached to the sleeve so that it moves axially with the sleeve and is constructed and arranged to synchronize the engagement between the sleeve and the coupling member.

A number of variations may include a method of synchronizing an axle disconnect assembly comprising: providing a clutch assembly between an input shaft and an axle shaft, wherein the clutch assembly comprises a clutch sleeve operably attached to the axle shaft so that the clutch sleeve rotates with the axle shaft and moves axially on the axle shaft and a coupling member operably attached to the input shaft; providing a synchronizer comprising a friction cone, a blocking ring, and an energizing spring in operative communication with the blocking ring and attaching the friction cone to the clutch sleeve; actuating the clutch assembly to move the clutch sleeve axially toward the coupling member; energizing the blocking ring with the energizing spring so that the blocking ring clocks to a blocking position preventing engagement of the clutch sleeve with the coupling member; synchronizing a rotational speed of the clutch sleeve with a rotational speed of the coupling member with a friction surface of the friction cone and a friction surface on the blocking ring; and releasing the blocking ring from the blocking position with the energizing spring so that the clutch sleeve passes over the blocking ring and engages with the coupling member.

A number of variations may include a product comprising: an axle shaft and an input shaft, wherein the axle shaft is coaxial with the input shaft; a clutch operatively connected to the axle shaft and the input shaft constructed and arranged to selectively couple and decouple the input shaft and the axle shaft, wherein the clutch comprises a shift fork assembly comprising a shift fork shaft and a shift fork which extends radially outward from an outer surface of the shift fork shaft, a sleeve operatively connected to and driven by the shift fork and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and an actuator having an actuator shaft, wherein the actuator is constructed and arranged to move the actuator shaft axially between a first position and a second position so that the actuator shaft drives the shift fork assembly and the sleeve between the first position and the second position, and wherein in the first position the sleeve is not engaged with the coupling member and wherein in the second position the sleeve is engaged with the coupling member.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
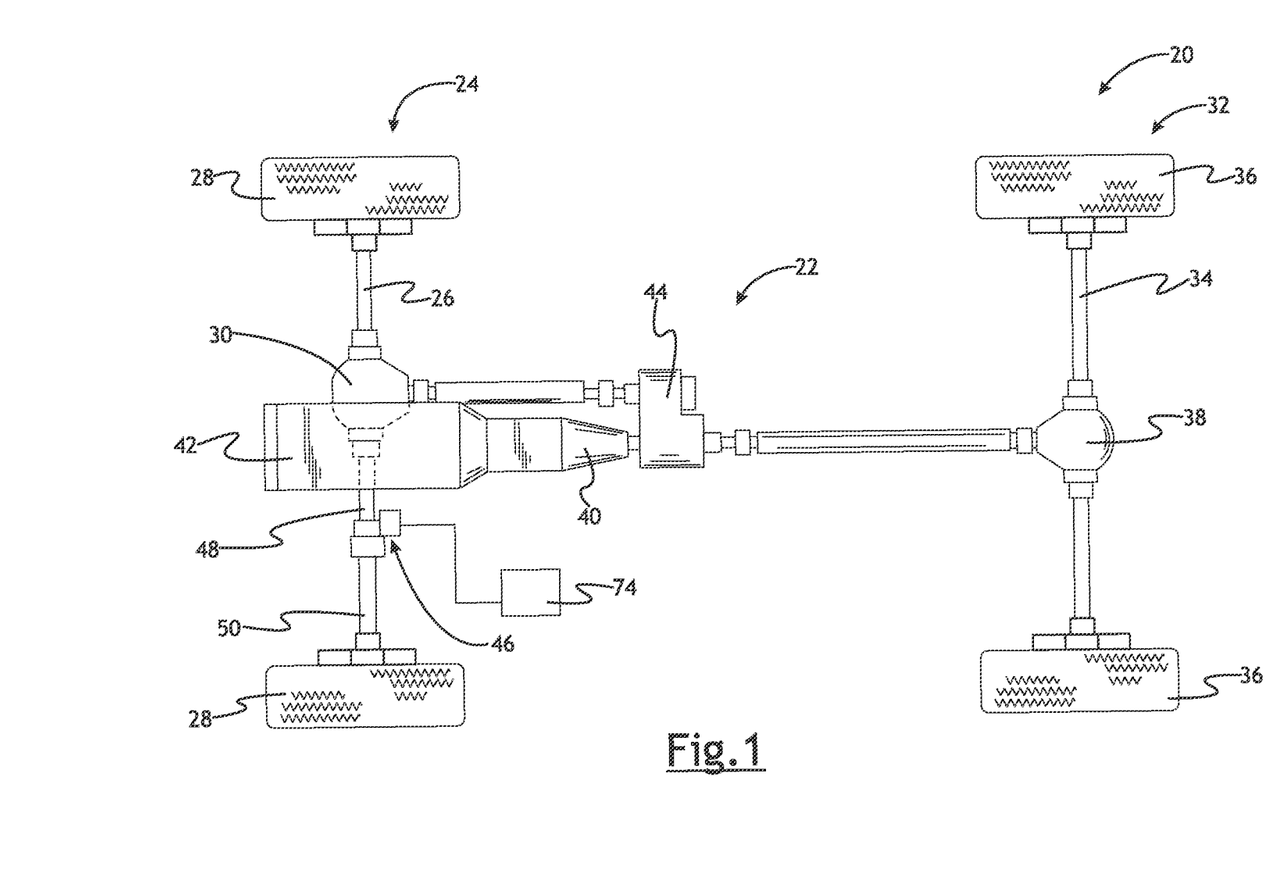
FIG. 1 illustrates a vehicle schematic according to a number of variations.

Referring to FIG. 1, in a number of variations, a four-wheel drive or all-wheel drive vehicle 20 may include a powertrain 22 which may include a first driveline 24 and a second driveline 32. The first driveline 24 may include a first drive shaft 26 which may drive a first set of wheels 28, and the second driveline 32 may include a second drive shaft 34 which may drive a second set of wheels 36. A transmission 40 may be operatively connected to the first and second drivelines 24, 32. The transmission 40 may generate and deliver torque from an engine 42 including, but not limited to, an internal combustion engine, to the first and second drivelines 24, 32. A transfer case 44 may be operatively connected to the transmission 40 and may split rotational torque between the first and second drivelines 24, 32. The first driveline 24 may include a first differential 30 which may be constructed and arranged to receive rotational torque from the transfer case 44 and may split the rotational torque between the first set of wheels 28. In a number of variations, the second driveline 32 may include a second differential 38 which may be constructed and arranged to receive rotational torque from the transfer case 44 and may split the rotational torque between the second set of wheels 36. At least one axle disconnect assembly 46 may be operatively attached to the first or second driveline 24, 32. In a number of variations, the axle disconnect assembly 46 may selectively disconnect the first or second driveline 24, 32 from rotational communication with the transmission 40, transfer case 44, and the first or second differential 30, 38. An axle disconnect assembly 46 may minimize parasitic loss by eliminating unnecessary rotation and/or torque translation which may increase the efficiency of the powertrain system when the four-wheel drive or all-wheel drive vehicle 20 is operating in a two-wheel drive mode, as will be discussed hereafter.

Referring to FIGS. 2-5, in a number of variations, an axle disconnect assembly 46 may be operatively connected to an axle shaft 48 and an input shaft 50 which may be coaxial with the axle shaft 48. In a number of variations, a clutch assembly 52 may be operatively connected to the axle shaft 48 and the input shaft 50, and may be constructed and arranged to selectively couple and decouple the axle shaft 48 and the input shaft 50 upon actuation by an actuator 68. When the axle shaft 48 and the input shaft 50 are coupled together, rotational torque may be translated between the axle shaft 48 and the input shaft 50. When the axle shaft 48 and the input shaft 50 are not coupled together, rotational torque may be interrupted between the axle shaft 48 and the input shaft 50. Any number of clutch assemblies 52 may be used including, but not limited to, dog clutches.

Figure 2:
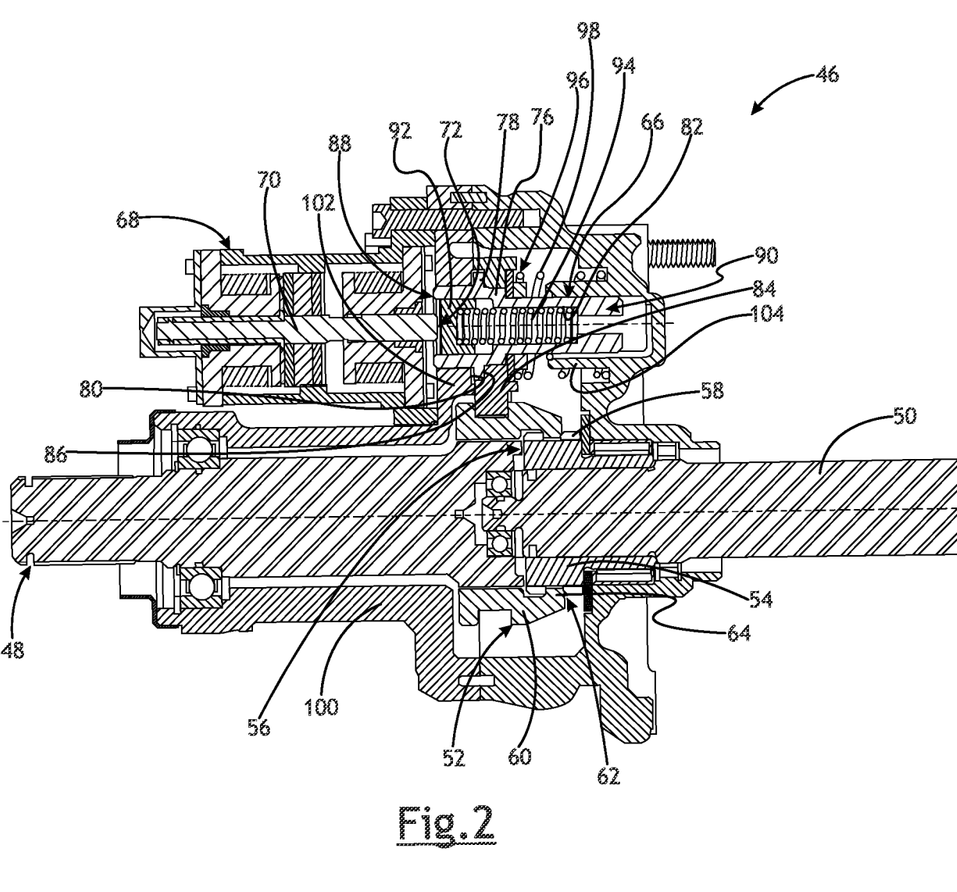
FIG. 2 illustrates a section view of a front axle disconnect assembly according to a number of variations.
Figure 3:
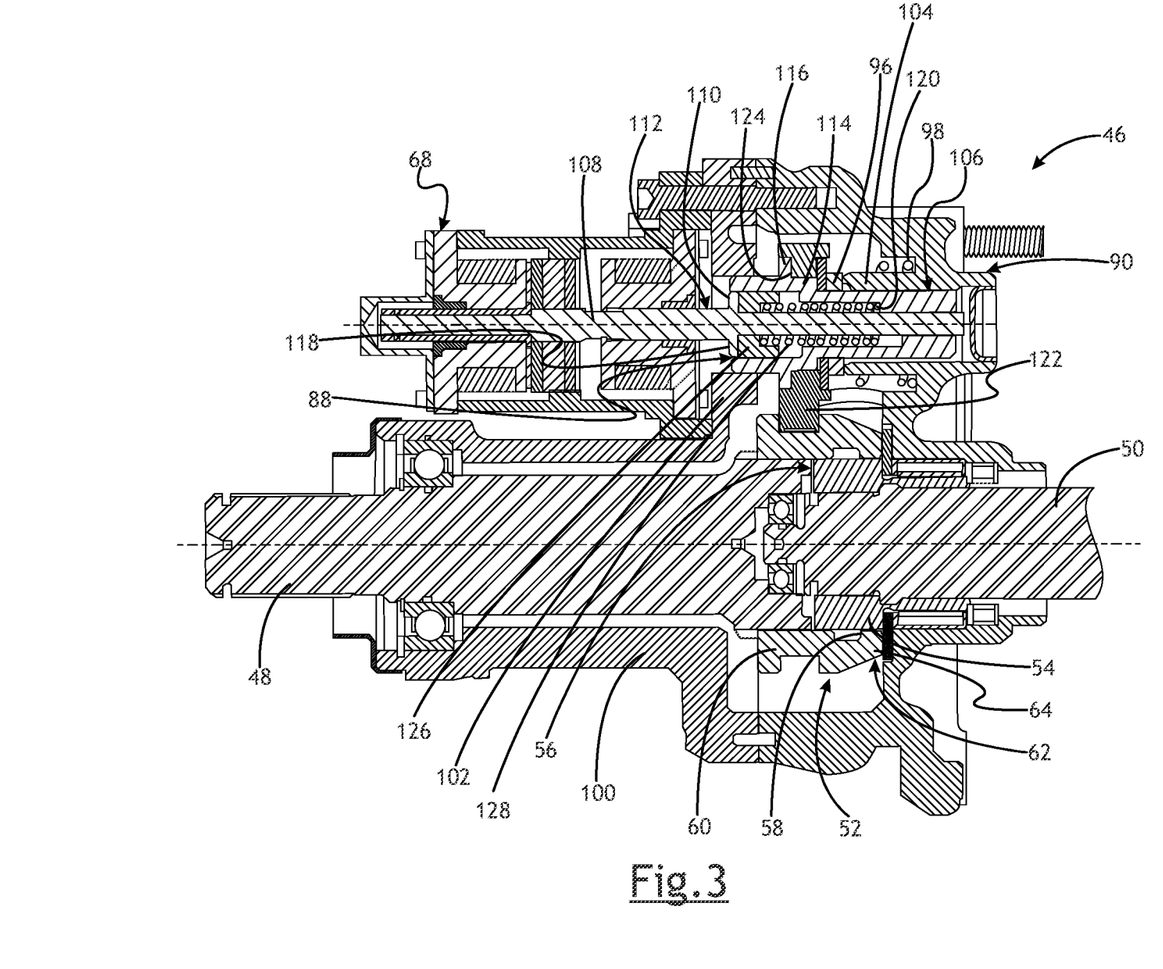
FIG. 3 illustrates a section view of a front axle disconnect assembly according to a number of variations.
Figure 4:
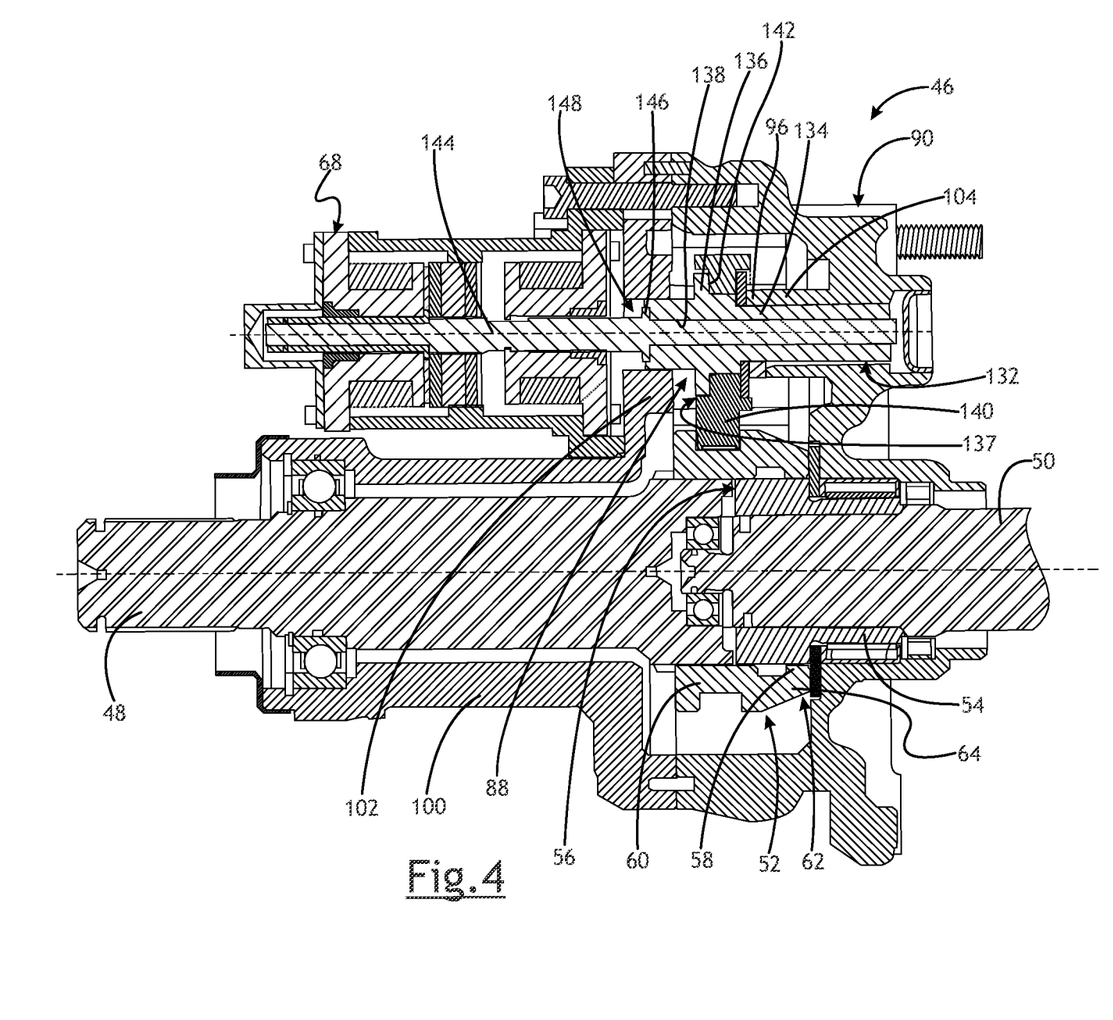
FIG. 4 illustrates a section view of a front axle disconnect assembly according to a number of variations.
Figures 5, 6:
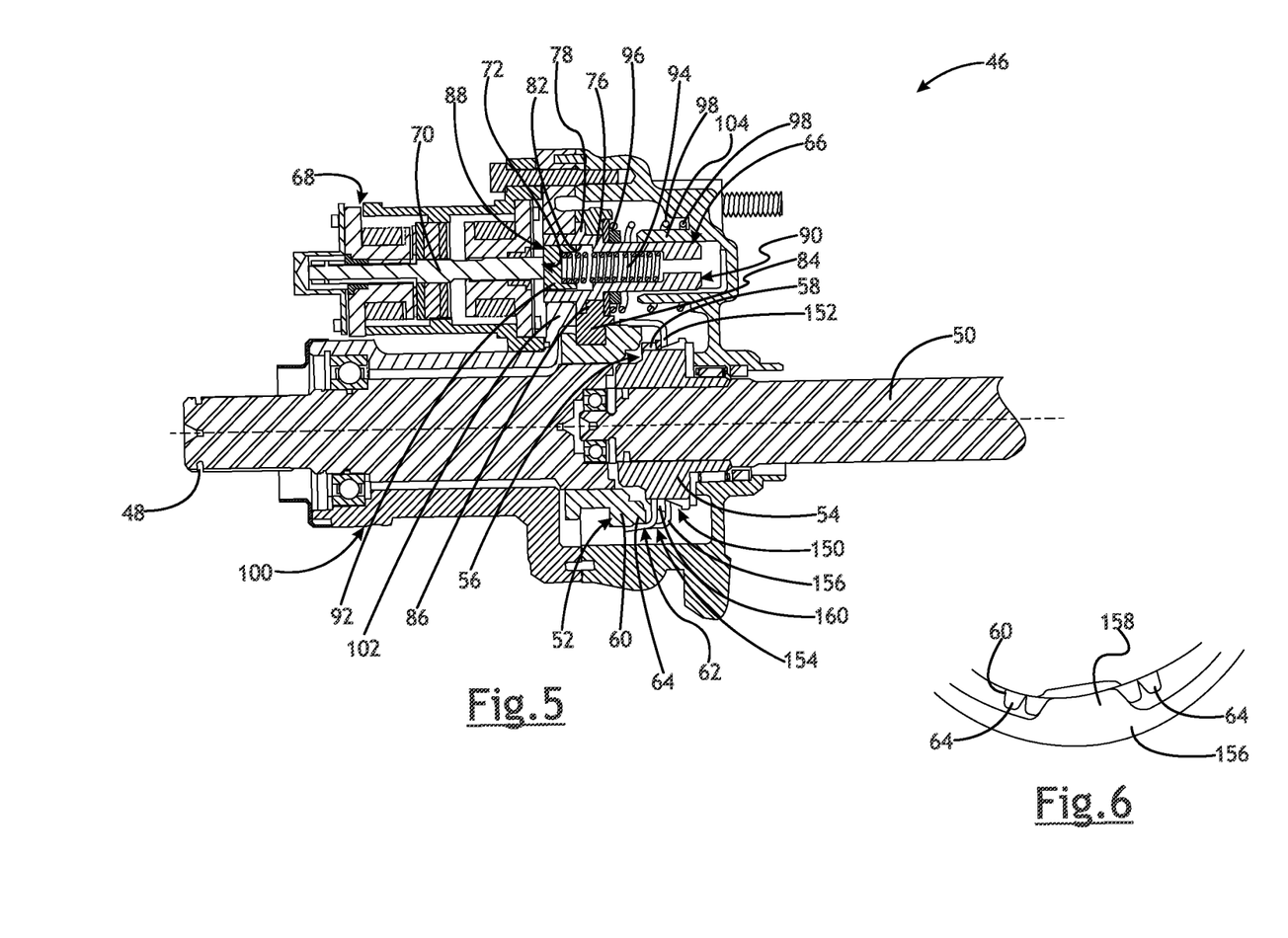
FIG. 5 illustrates a section view of a front axle disconnect assembly according to a number of variations.
FIG. 6 illustrates a close-up perspective view of a synchronizer according to a number of variations.

In a number of variations, a clutch assembly 52 may comprise a coupling member 54 which may be operatively connected to the input shaft 50 so that it may rotate with the input shaft 50 and a clutch sleeve 60 which may be attached to the axle shaft 48 through a splined connection so that the clutch sleeve 60 may rotate with the axle shaft 48 and may also move axially along the axle shaft 48. The coupling member 54 may include a first end 56 which may include a plurality of teeth 58 and the clutch sleeve 60 may also include a first end 62 which may include a plurality of teeth 64 which may be constructed and arranged to selectively engage the plurality of teeth 58 on the coupling member through a spline connection. In a number of variations, the plurality of teeth 74 on the clutch sleeve 60 may engage the teeth 58 of the coupling member 54 when the clutch sleeve 60 is moved axially from a first disengaged position (a variation of which is illustrated in FIGS. 2 & 5) to a second engaged position (variations of which are illustrated in FIGS. 3-4). When the plurality of teeth 64 on the clutch sleeve 60 are engaged with the plurality of teeth 58 on the coupling member 54, the axle shaft 48 and the input shaft 50 may be coupled together so that they may rotate together. In a number of variations, the clutch sleeve 60 may be constructed and arranged to accept a shift fork 84, 122, 140 of a shift fork assembly 84, 122, 140 which may be used to drive the clutch sleeve 60 from the disengaged position where the axle shaft 48 is not coupled with the input shaft 50 or to the engaged position where the axle shaft 48 is coupled to the input shaft 50.

In a number of variations, the shift fork assembly 84, 122, 140 may be moved axially between the first disengaged position and the second engaged position by an actuator shaft 70, 108, 144. In a number of variations, the actuator shaft 70, 108, 144 may be operatively attached to any number of actuators 68 including, but not limited to, electromagnetic, electromechanical, and/or hydraulic. The actuator 68 may move the actuator shaft 70, 108, 144 axially between a first position and a second position. In a number of variations, the actuator 68 may be operatively connected to a controller 74 (a variation of which is illustrated in FIG. 1) which may send a signal to the actuator 68 to move the actuator shaft 70, 108, 144 axially from the first position to the second position which may cause the shift fork assembly 66, 106, 132 to move axially causing the clutch sleeve 60 to move from a disengaged position to an engaged position. The engagement of the clutch sleeve 60 and the coupling member 54 may couple the axle shaft 48 and the input shaft 50 together. In a number of variations, the position of the actuator shaft 70 may be determined by inductance where a phase shift occurs between the engaged and disengaged states as further defined in patent application Ser. No. 14/642,878 which is herein incorporated by reference.

Referring to FIGS. 2-3, in a number of variations, a shift fork assembly 66 may comprise a shift fork shaft 76 which may be attached to a shift fork 84 so that the shift fork 84 may move axially with the shift fork shaft 76. In a number of variations, the shift fork shaft 76 may include a lip 78 which may extend radially from an outer diameter of the shift fork shaft 76 and which may be constructed and arranged to mate with a cutout 86 in the shift fork 84. A snap-ring 96 may be used to secure the shift fork 84 and the shift fork shaft 76 together.

In a number of variations, the shift fork shaft 76 may also include an internal cavity 82 which may be constructed and arranged to accommodate a plunger 92 operatively attached to a blocking spring 94 so that the plunger 92 may be spring-loaded. In a number of variations, the blocking spring 94 within the shift fork shaft 76 may absorb impact of engagement between the clutch sleeve 60 and the coupling member 54 if tooth-to-tooth contact and/or heavy spline drag occurs.

In a number of variations, the shift fork shaft 76 may be positioned between a shoulder 102 formed in the housing 100 adjacent a first end 88 of the shift fork shaft 76 and a protrusion 104 formed in the housing 100 which extends from an end 90 of the housing 100 so that when the shift fork shaft 76 may be moved to the second position the snap-ring 96 on the shift fork shaft 76 may abut the protrusion 104 in the housing 100, and so that when the shift fork shaft 76 may be moved back to the first position, a first surface 80 of the radial lip 78 on the shift fork shaft 76 and the shift fork 84 may abut the shoulder 102 of the housing 100.

In a number of variations, a return spring 98 may be operatively attached to and may surround the shift fork shaft 76 and may bias the shift fork shaft 76 so that it may provide additional assistance in the disengagement of the clutch sleeve 60 from the coupling member 54.

In a number of variations, the actuator shaft 70 may be operatively connected to a first end 88 of the shift fork assembly 66. During engagement, the actuator 68 may cause the actuator shaft 70 to move axially so that the first end 72 of the actuator shaft 70 pushes the plunger 92 within the shift fork shaft 76 to an end-state causing the shift fork shaft assembly 66 and, therefore, the clutch sleeve 60 to move axially to the second position so that the teeth 64 on the clutch sleeve 60 may engage with the teeth 58 on the coupling member 54. During disengagement, the actuator 68 may cause the actuator shaft 70 to move axially from the second position to the first position which may release the force on the shift fork assembly 66 allowing the clutch sleeve 60 to move axially away from the second position to the first position so that the teeth 64 of the clutch sleeve 60 may disengage from the teeth 58 of the coupling member 54.

Referring to FIG. 3, in another variation, the shift fork assembly 106 may be constructed and arranged to allow for pullout assist which may perform discrete engagement and disengagement of the clutch assembly 52. In a number of variations, the shift fork assembly 106 may be constructed and arranged so that the actuator shaft 108 may extend through the entire length of the shift fork assembly 106 and may be directly coupled to the shift fork assembly 106, as will be discussed hereafter. In a number of variations, the shift fork assembly 106 may be operatively attached to a shift fork shaft 114 so that the shift fork 122 may move axially with the shift fork shaft 114. In a number of variations, the shift fork shaft 114 may include a lip 116 which may extend radially from an outer diameter of the shift fork shaft 114. The shift fork 122 may include a cutout 124 which may be constructed and arranged to accommodate the radial lip 116 on the shift fork shaft 114. A snap-ring 96 may be used to attach the shift fork 122 onto the shift fork shaft 114. The shift fork shaft 114 may also include an internal cavity 120 defined by an inner diameter of the shift fork shaft 114 which may be constructed and arranged to accommodate a plunger 126 operatively attached to a blocking spring 128 so that the plunger 126 may be spring-loaded. In a number of variations, the blocking spring 128 within the shift fork shaft 114 may absorb the impact of engagement between the clutch sleeve 60 and the coupling member 54 if tooth-to-tooth contact and/or heavy spline drag occurs.

In a number of variations, the shift fork shaft 114 may be positioned between a shoulder 102 adjacent a first end 88 of the shift fork shaft 114 and a protrusion 104 which extends from an end 90 of the housing 100 so that when the shift fork shaft 114 may be moved to the second position, the snap-ring 96 on the shift fork shaft 114 may abut the protrusion 104 in the housing 100, and so that when the shift fork shaft 114 may be moved back to the first position, a first surface 118 of the radial lip 116 on the shift fork shaft 114 and the shift fork 122 may abut the shoulder 102 in the housing 100.

In a number of variations, the actuator shaft 108 may include a shoulder 110 which may extend radially from a middle portion 112 of the actuator shaft 108 which may be constructed and arranged to abut the plunger 126 within the shift fork shaft 114. The actuator shaft 108 may extend through the shift fork shaft 114, the plunger 126, and the blocking spring 128 and may be directly coupled to the shift fork shaft 114.

During engagement, the shoulder 110 on the actuator shaft 108 may push the plunger 126 within the shift fork shaft 114 to an end-state causing the shift fork shaft 114 and the shift fork 122 to move the clutch sleeve 60 axially to a second position so that the teeth 64 on the clutch sleeve 52 may engage with the teeth 58 of the coupling member 54. During disengagement, the actuator 68 may cause the actuator shaft 108 to move axially from the second position to the first position which may release the plunger 126 and the shift fork shaft 114 which may allow the shift fork assembly 106 to move the clutch sleeve 60 axially away from the coupling member 54 to disengage the clutch sleeve 60 from the coupling member 54.

In a number of variations, a return spring 98 may be operatively attached to the shift fork shaft 114 to provide additional assistance in the disengagement of the clutch sleeve 60 from the coupling member 54.

Referring to FIG. 4, in another variation, the shift fork assembly 132 may be constructed and arranged to be direct-acting. A direct-acting shift fork assembly 132 may allow for discrete engagement and disengagement of the clutch assembly 52. In a number of variations, a direct-acting shift fork assembly 132 may include a shift fork shaft 134 which may be operatively connected to a shift fork 104. In a number of variations, the shift fork shaft 134 may include a lip 136 which may extend radially from an outer diameter of the shift fork shaft 134. The shift fork 140 may include a cutout 142 which may be constructed and arranged to accommodate the radial lip 136 on the shift fork shaft 134. A snap-ring 96 may be used to attach the shift fork 140 to the shift fork shaft 134. The shift fork shaft 134 may also include an internal cavity 138 defined by an inner diameter of the shift fork shaft 134 which may extend through the shift fork shaft 134 and which may be constructed and arranged so that the actuator shaft 144 may extend through the entire length of the shift fork assembly 132.

In a number of variations, the actuator shaft 144 may include a shoulder 146 which may extend radially from a middle portion 148 of the actuator shaft 144. The shoulder 146 on the actuator shaft 144 may be used to directly attach the actuator shaft 144 to the shift fork shaft 134.

In a number of variations, the shift fork shaft 134 may be positioned between a shoulder 102 formed in the housing 100 adjacent a first end 88 of the shift fork shaft 134 and a protrusion 104 extending from an end 90 of the housing 100 so that when the shift fork shaft 134 may be at the first position, a first surface 137 of the radial lip 136 on the shift fork shaft 134 and the shift fork 140 may abut the shoulder 102 and so that when the shift fork shaft 134 may be moved to the second position, the snap-ring 96 on the shift fork shaft 134 may abut the protrusion 104 in the housing 100.

During engagement, the actuator shaft 144 may move the shift fork shaft 134 axially so that the clutch sleeve 60 may move axially to a second position causing the teeth 64 on the clutch sleeve 60 to engage with the teeth 58 of the coupling member 54. During disengagement, the actuator 68 may cause the actuator shaft 144 to move axially from the second position to the first position which may cause the shift fork 140 to move the clutch sleeve 60 axially so that the teeth 64 on the clutch sleeve 60 may disengage from the teeth 58 on the coupling member 54.

In a number of variations, the direct-acting shift fork assembly 132 may allow the bi-stable front axle disconnect 46 to be direct acting as the actuator shaft 144 may be directly coupled to the shift fork shaft 134 and the clutch sleeve 60. Therefore, any movement of the actuator 68 directly impacts translation of the components resulting in the engagement or the disengagement of the clutch sleeve 60 and the coupling member 54. This may be particularly beneficial in systems using a sensorless design as it may provide exact positioning of the translating components through inductance.

Referring to FIGS. 5-6, in a number of variations, a synchronizer 150 may be operatively connected to the clutch assembly 52 to synchronize the coupling of the axle shaft 48 and the input shaft 50 which may allow for smooth engagement of the axle shaft 48 and the input shaft 50 which may improve noise, vibration, and harshness (NVH) of the vehicle 20. Any number of synchronizers 150 may be used including, but not limited to, single or multiple cone synchronizers.

In a number of variations, a friction cone 152 of the synchronizer 150 may be operatively attached to the clutch sleeve 60 to form a sleeve/cone assembly 154. This may allow the friction cone 152 to move axially with the sleeve 60 so that it is not fixed in a position. The sleeve/cone assembly 154 may be driven axially by the shift fork 66 toward the coupling member 54 when engagement between the input shaft 50 and the axle shaft 48 may be desired. The blocking ring 156 may be interposed between the sleeve/cone assembly 154 and the coupling member 54 and may prevent the plurality of teeth 64 on the sleeve/cone assembly 154 from engaging with the plurality of teeth 58 on the coupling member 54 when the input shaft 50 and the axle shaft 48 are rotating at different speeds, as will be discussed hereafter. In a number of variations, the blocking ring 156 may include a plurality of tabs 158, a variation of which is illustrated in FIG. 6, which may include a chamfer or bend at each corner of the tab 158 which may be constructed and arranged to prevent the plurality of teeth 64 on the sleeve/cone assembly 154 from engaging the plurality of teeth 58 on the coupling member 54 while the sleeve/cone assembly 154 and the coupling member 54 are rotating at different speeds. The blocking ring 156 may be coated with any number of materials including, but not limited to, a molly, sintered bronze, brass, or carbon fiber lining friction material. In a number of variations, an energizing spring 160 may be operatively attached to the blocking ring 156. When the sleeve/cone assembly 154 is moved axially toward the coupling element 54, the energizing spring 160 may apply a force to the blocking ring 156 so that the synchronizer 150 may create a torque which may clock or twist the blocking ring 156 to a blocking position, a variation of which is illustrated in FIG. 6, while the rotational speed of the sleeve/cone assembly 154 and the coupling member 54 are not synchronized. In the blocking position, the plurality of teeth 64 on the sleeve 60 may be prevented from moving past the blocking ring 156. While the sleeve/cone assembly 154 may be prevented from moving past the blocking ring 156 and engaging the coupling member 54, a friction surface on the sleeve/cone assembly 154 may move axially along a friction surface on the blocking ring 156 creating a frictional torque which may synchronize the rotational speeds of the sleeve/cone assembly 154 and the coupling member 54. Once synchronization of the rotational speeds of the sleeve/cone assembly 154 and the coupling member 54 is completed, the blocking ring 156 may no longer be energized by the energizing spring 160 so that the blocking ring 156 may move to a position which may allow the plurality of teeth 64 of the sleeve/cone assembly 154 to move axially past the blocking ring 156 so that the plurality of teeth 64 on the sleeve 60 may engage with the plurality of teeth 58 on the coupling member 54 allowing torque to be transmitted to the coupling member 54.

Referring to FIGS. 2-5, in a number of variations, a housing 100 may surround at least a portion of the actuator 68, shift fork assembly 66, 106, 132, the clutch assembly 52, and the synchronizer 150 (if a synchronizer is present).

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an axle shaft and an input shaft, wherein the axle shaft is coaxial with the input shaft; a clutch operatively connected to the axle shaft and the input shaft constructed and arranged to selectively couple and decouple the input shaft and the axle shaft; an actuator operatively connected to the clutch to drive the clutch; and a synchronizer operatively connected to the clutch to synchronize the coupling of the input shaft and the axle shaft.

Variation 2 may include a product as set forth in Variation 1 wherein the clutch further comprises a shift fork assembly, a sleeve operatively connected to and driven by the shift fork assembly and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and wherein the actuator is constructed and arranged to move the shift fork assembly axially between a first position and a second position, and wherein in the first position the sleeve is not engaged with the coupling member and wherein in the second position the sleeve is engaged with the coupling member.

Variation 3 may include a product as set forth in any of Variations 1-2 wherein the synchronizer is a cone synchronizer, and wherein a friction cone of the synchronizer is attached to the sleeve and is constructed and arranged to move axially with the sleeve.

Variation 4 may include a product as set forth in Variation 3 wherein the synchronizer further comprises a blocking ring and an energizing spring interposed between the sleeve and the coupling member, and wherein the synchronizer is constructed and arranged so that when engagement between the input shaft and the axle shaft is actuated the energizing spring creates a torque which clocks the blocking ring to a blocking position which blocks the plurality of teeth on the sleeve from engaging with the plurality of teeth on the coupling member when the input shaft and the axle shaft are rotating at different speeds.

Variation 5 may include a product as set forth in Variation 4 wherein when the input shaft and the axle shaft are rotating at different speeds, the synchronizer is constructed and arranged so that a friction surface on the friction cone assembly moves axially along a friction surface of the blocking ring to create a frictional torque to synchronize the rotational speeds of the sleeve and the coupling member and wherein once the rotational speed of the sleeve and coupling member are synchronized, the energizing spring releases the blocking spring from the blocking position.

Variation 6 may include a product as set forth in Variation 5 wherein the blocking ring comprises a plurality of chamfered tabs.

Variation 7 may include a product as set forth in any of Variations 2-6 further comprising a return spring operatively connected to the shift fork shaft to bias the shift fork shaft to the first position.

Variation 8 may include a product as set forth in any of Variations 2-7 wherein the actuator shaft extends through an entire length of the shift fork shaft and is directly coupled to the shift fork shaft.

Variation 9 may include a product as set forth in any of Variations 2-8 wherein the shift fork assembly further comprises a spring-loaded plunger within an internal cavity of the shift fork shaft.

Variation 10 may include an axle disconnect assembly for translating rotational torque between an input shaft and an axle shaft comprising: a clutch operatively connected to the input shaft and the axle shaft, wherein the clutch is constructed and arranged to selectively couple and decouple the input shaft and the axle shaft, wherein the clutch comprises a shift fork assembly operatively connected to a sleeve, wherein the shift fork assembly is constructed and arranged to move the sleeve axially in relation to the input shaft and the axle shaft, and a coupling member operatively connected to the input shaft; wherein when the sleeve is in a first position, the input shaft and the axle shaft are not coupled together and wherein when the sleeve is in a second position the input shaft and the axle shaft are coupled together; and a cone synchronizer, wherein a friction cone of the cone synchronizer is operably attached to the sleeve so that it moves axially with the sleeve and is constructed and arranged to synchronize the engagement between the sleeve and the coupling member.

Variation 11 may include an axle disconnect assembly as set forth in Variation 10 wherein the synchronizer further comprises a blocking ring and an energizing spring interposed between the sleeve and the coupling member, and wherein the synchronizer is constructed and arranged so that when engagement between the input shaft and the axle shaft is actuated the energizing spring creates a torque which clocks the blocking ring to a blocking position which blocks a plurality of teeth on the sleeve from engaging with a plurality of teeth on the coupling member when the input shaft and the axle shaft are rotating at different speeds.

Variation 12 may include an axle disconnect assembly as set forth in Variation 11 wherein when the input shaft and the axle shaft are rotating at different speeds, the synchronizer is constructed and arranged so that a friction surface on the friction cone moves axially along a friction surface on the blocking ring to create a frictional torque to synchronize the rotational speeds of the sleeve and the coupling member and wherein once the rotational speed of the sleeve and the coupling member are synchronized, the energizing spring releases the blocking spring from the blocking position.

Variation 13 may include an axle disconnect assembly as set forth in any of Variations 10-12 further comprising a return spring operatively connected to the shift fork assembly to bias the shift fork assembly to the first position.

Variation 14 may include a method of synchronizing an axle disconnect assembly comprising: providing a clutch assembly between an input shaft and an axle shaft, wherein the clutch assembly comprises a clutch sleeve operably attached to the axle shaft so that the clutch sleeve rotates with the axle shaft and moves axially on the axle shaft and a coupling member operably attached to the input shaft; providing a synchronizer comprising a friction cone, a blocking ring, and an energizing spring in operative communication with the blocking ring and attaching the friction cone to the clutch sleeve; actuating the clutch assembly to move the clutch sleeve axially toward the coupling member; energizing the blocking ring with the energizing spring so that the blocking ring clocks to a blocking position preventing engagement of the clutch sleeve with the coupling member; synchronizing a rotational speed of the clutch sleeve with a rotational speed of the coupling member with a friction surface of the friction cone and a friction surface on the blocking ring; and releasing the blocking ring from the blocking position with the energizing spring so that the clutch sleeve passes over the blocking ring and engages with the coupling member.

Variation 15 may include a product comprising: an axle shaft and an input shaft, wherein the axle shaft is coaxial with the input shaft; a clutch operatively connected to the axle shaft and the input shaft constructed and arranged to selectively couple and decouple the input shaft and the axle shaft, wherein the clutch comprises a shift fork assembly comprising a shift fork shaft and a shift fork which extends radially outward from an outer surface of the shift fork shaft, a sleeve operatively connected to and driven by the shift fork and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and an actuator having an actuator shaft, wherein the actuator is constructed and arranged to move the actuator shaft axially between a first position and a second position so that the actuator shaft drives the shift fork assembly and the sleeve between the first position and the second position, and wherein in the first position the sleeve is not engaged with the coupling member and wherein in the second position the sleeve is engaged with the coupling member.

Variation 16 may include a product as set forth in Variation 15 wherein the actuator shaft extends through an entire length of the shift fork shaft and is directly coupled to the shift fork shaft.

Variation 17 may include a product as set forth in any of Variations 15-16 wherein the shift fork assembly further comprises a spring-loaded plunger within an internal cavity of the shift fork shaft.

Variation 18 may include a product as set forth in Variation 17 wherein an end of the actuator shafts abuts the plunger and drives the plunger.

Variation 19 may include a product as set forth in Variation 17 wherein the actuator shaft extends through the plunger and the internal cavity.

Variation 20 may include a product as set forth in any of Variations 15-19 further comprising a synchronizer operatively attached to the clutch.

The above description of select variations within the scope of the invention is merely illustrative in nature and, thus, variations or variants thereof are not to be regarded as a departure from the spirit and scope of the invention.

What is claimed is:

1. A product comprising: an axle shaft and an input shaft, wherein the axle shaft is coaxial with the input shaft;
   a clutch operatively connected to the axle shaft and the input shaft constructed and arranged to selectively couple and decouple the input shaft and the axle shaft;
   an actuator operatively connected to the clutch to drive the clutch; and
   a synchronizer operatively connected to the clutch to synchronize the coupling of the input shaft and the axle shaft, the synchronizer comprising a friction cone, a blocking ring, and an energizing spring in operative communication with the blocking ring and attaching the friction cone to a clutch sleeve.

2. The product of claim 1 wherein the clutch further comprises a shift fork assembly, the sleeve operatively connected to and driven by the shift fork assembly and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and wherein the actuator is constructed and arranged to move the shift fork assembly axially between a first position and a second position, and wherein in the first position the sleeve is not engaged with the coupling member and wherein in the second position the sleeve is engaged with the coupling member.

3. The product of claim 2 wherein the synchronizer is constructed and arranged to move axially with the sleeve.

4. A product comprising: an axle shaft and an input shaft, wherein the axle shaft is coaxial with the input shaft;
a clutch operatively connected to the axle shaft and the input shaft constructed and arranged to selectively couple and decouple the input shaft and the axle shaft;
an actuator operatively connected to the clutch to drive the clutch; and
a synchronizer operatively connected to the clutch to synchronize the coupling of the input shaft and the axle shaft;
wherein the clutch further comprises a shift fork assembly, a sleeve operatively connected to and driven by the shift fork assembly and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and
wherein the actuator is constructed and arranged to move the shift fork assembly axially between a first position and a second position, and wherein in the first position the sleeve is not engaged with the coupling member and wherein in the second position the sleeve is engaged with the coupling member;
wherein the synchronizer is a cone synchronizer, and wherein a friction cone of the synchronizer is attached to the sleeve and is constructed and arranged to move axially with the sleeve;
wherein the synchronizer further comprises a blocking ring and an energizing spring interposed between the sleeve and the coupling member, and wherein the synchronizer is constructed and arranged so that when engagement between the input shaft and the axle shaft is actuated the energizing spring creates a torque which clocks the blocking ring to a blocking position which blocks the plurality of teeth on the sleeve from engaging with the plurality of teeth on the coupling member when the input shaft and the axle shaft are rotating at different speeds.

5. The product of claim 4 wherein when the input shaft and the axle shaft are rotating at different speeds, the synchronizer is constructed and arranged so that a friction surface on the friction cone assembly moves axially along a friction surface of the blocking ring to create a frictional torque to synchronize the rotational speeds of the sleeve and the coupling member and wherein once the rotational speed of the sleeve and coupling member are synchronized, the energizing spring releases the blocking spring from the blocking position.

6. The product of claim 4 wherein the blocking ring comprises a plurality of chamfered tabs.

7. The product of claim 4 wherein the actuator shaft extends through an entire length of the shift fork shaft and is directly coupled to the shift fork shaft.

8. A product comprising: an axle shaft and an input shaft, wherein the axle shaft is coaxial with the input shaft;
a clutch operatively connected to the axle shaft and the input shaft constructed and arranged to selectively couple and decouple the input shaft and the axle shaft;
an actuator operatively connected to the clutch to drive the clutch; and
a synchronizer operatively connected to the clutch to synchronize the coupling of the input shaft and the axle shaft;
wherein the clutch further comprises a shift fork assembly, a sleeve operatively connected to and driven by the shift fork assembly and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and
wherein the actuator is constructed and arranged to move the shift fork assembly axially between a first position and a second position, and wherein in the first position the sleeve is not engaged with the coupling member and wherein in the second position the sleeve is engaged with the coupling member, further comprising a return spring operatively connected to the shift fork shaft to bias the shift fork shaft to the first position.

9. A product comprising: an axle shaft and an input shaft, wherein the axle shaft is coaxial with the input shaft;
a clutch operatively connected to the axle shaft and the input shaft constructed and arranged to selectively couple and decouple the input shaft and the axle shaft;
an actuator operatively connected to the clutch to drive the clutch; and
a synchronizer operatively connected to the clutch to synchronize the coupling of the input shaft and the axle shaft;
wherein the clutch further comprises a shift fork assembly, a sleeve operatively connected to and driven by the shift fork assembly and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and
wherein the actuator is constructed and arranged to move the shift fork assembly axially between a first position and a second position, and wherein in the first position the sleeve is not engaged with the coupling member and wherein in the second position the sleeve is engaged with the coupling member, wherein the shift fork assembly further comprises a spring-loaded plunger within an internal cavity of the shift fork shaft.

10. An axle disconnect assembly for translating rotational torque between an input shaft and an axle shaft comprising:
a clutch operatively connected to the input shaft and the axle shaft, wherein the clutch is constructed and arranged to selectively couple and decouple the input shaft and the axle shaft, wherein the clutch comprises a shift fork assembly operatively connected to a sleeve, wherein the shift fork assembly is constructed and arranged to move the sleeve axially in relation to the input shaft and the axle shaft, and a coupling member operatively connected to the input shaft;
wherein when the sleeve is in a first position, the input shaft and the axle shaft are not coupled together and wherein when the sleeve is in a second position the input shaft and the axle shaft are coupled together; and a cone synchronizer, wherein a friction cone of the cone synchronizer is operably attached to the sleeve so that it moves axially with the sleeve and is constructed and arranged to synchronize the engagement between the sleeve and the coupling member, the cone synchronizer further comprising a blocking ring, and an energizing spring in operative communication with the blocking ring and attaching the cone synchronizer to a clutch sleeve.

11. An axle disconnect assembly for translating rotational torque between an input shaft and an axle shaft comprising:

a clutch operatively connected to the input shaft and the axle shaft, wherein the clutch is constructed and arranged to selectively couple and decouple the input shaft and the axle shaft, wherein the clutch comprises a shift fork assembly operatively connected to a sleeve, wherein the shift fork assembly is constructed and arranged to move the sleeve axially in relation to the input shaft and the axle shaft, and a coupling member operatively connected to the input shaft;

wherein when the sleeve is in a first position, the input shaft and the axle shaft are not coupled together and wherein when the sleeve is in a second position the input shaft and the axle shaft are coupled together; and a cone synchronizer, wherein a friction cone of the cone synchronizer is operably attached to the sleeve so that it moves axially with the sleeve and is constructed and arranged to synchronize the engagement between the sleeve and the coupling member, wherein the synchronizer further comprises a blocking ring and an energizing spring interposed between the sleeve and the coupling member, and wherein the synchronizer is constructed and arranged so that when engagement between the input shaft and the axle shaft is actuated the energizing spring creates a torque which clocks the blocking ring to a blocking position which blocks a plurality of teeth on the sleeve from engaging with a plurality of teeth on the coupling member when the input shaft and the axle shaft are rotating at different speeds.

12. The axle disconnect assembly of claim 11 wherein when the input shaft and the axle shaft are rotating at different speeds, the synchronizer is constructed and arranged so that a friction surface on the friction cone moves axially along a friction surface on the blocking ring to create a frictional torque to synchronize the rotational speeds of the sleeve and the coupling member and wherein once the rotational speed of the sleeve and the coupling member are synchronized, the energizing spring releases the blocking spring from the blocking position.

13. An axle disconnect assembly for translating rotational torque between an input shaft and an axle shaft comprising:

a clutch operatively connected to the input shaft and the axle shaft, wherein the clutch is constructed and arranged to selectively couple and decouple the input shaft and the axle shaft, wherein the clutch comprises a shift fork assembly operatively connected to a sleeve, wherein the shift fork assembly is constructed and arranged to move the sleeve axially in relation to the input shaft and the axle shaft, and a coupling member operatively connected to the input shaft;

wherein when the sleeve is in a first position, the input shaft and the axle shaft are not coupled together and wherein when the sleeve is in a second position the input shaft and the axle shaft are coupled together; and a cone synchronizer, wherein a friction cone of the cone synchronizer is operably attached to the sleeve so that it moves axially with the sleeve and is constructed and arranged to synchronize the engagement between the sleeve and the coupling member, further comprising a return spring operatively connected to the shift fork assembly to bias the shift fork assembly to the first position.

14. A method of synchronizing an axle disconnect assembly comprising:

providing a clutch assembly between an input shaft and an axle shaft, wherein the clutch assembly comprises a clutch sleeve operably attached to the axle shaft so that the clutch sleeve rotates with the axle shaft and moves axially on the axle shaft and a coupling member operably attached to the input shaft;

providing a synchronizer comprising a friction cone, a blocking ring, and an energizing spring in operative communication with the blocking ring and attaching the friction cone to the clutch sleeve;

actuating the clutch assembly to move the clutch sleeve axially toward the coupling member;

energizing the blocking ring with the energizing spring so that the blocking ring clocks to a blocking position preventing engagement of the clutch sleeve with the coupling member;

synchronizing a rotational speed of the clutch sleeve with a rotational speed of the coupling member with a friction surface of the friction cone and a friction surface on the blocking ring; and releasing the blocking ring from the blocking position with the energizing spring so that the clutch sleeve passes over the blocking ring and engages with the coupling member.

15. A product comprising:

an axle shaft and an input shaft, wherein the axle shaft is coaxial with the input shaft;

a clutch operatively connected to the axle shaft and the input shaft constructed and arranged to selectively couple and decouple the input shaft and the axle shaft, wherein the clutch comprises a shift fork assembly comprising a shift fork shaft and a shift fork which extends radially outward from an outer surface of the shift fork shaft, a sleeve operatively connected to and driven by the shift fork and operatively connected to the axle shaft, and a coupling member operatively connected to the input shaft, wherein the sleeve comprises a plurality of teeth and the coupling member comprises a plurality of teeth, and wherein the plurality of teeth on the sleeve are constructed and arranged to engage with the plurality of teeth on the coupling member; and an actuator having an actuator shaft, wherein the actuator is constructed and arranged to move the actuator shaft axially between a first position and a second position so that the actuator shaft drives the shift fork assembly and the sleeve between the first position and the second position, and wherein in the first position the sleeve is not engaged with the coupling member and wherein in the second position the sleeve is engaged with the coupling member.

16. The product of claim 15 wherein the actuator shaft extends through an entire length of the shift fork shaft and is directly coupled to the shift fork shaft.

17. The product of claim 15 wherein the shift fork assembly further comprises a spring-loaded plunger within an internal cavity of the shift fork shaft.

18. The product of claim 17 wherein an end of the actuator shaft abuts the plunger and drives the plunger.

19. The product of claim 17 wherein the actuator shaft extends through the plunger and the internal cavity.

20. The product of claim 15 further comprising a synchronizer operatively attached to the clutch.

\* \* \* \* \*